Nov. 29, 1966  C. E. BURFORD  3,288,271
CONVEYER
Filed Oct. 8, 1964
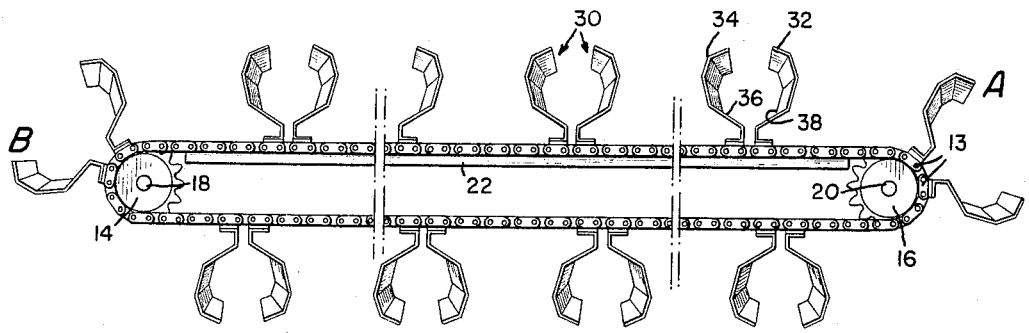
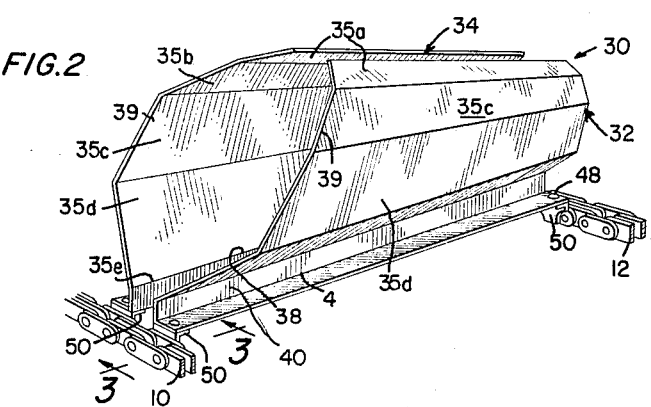
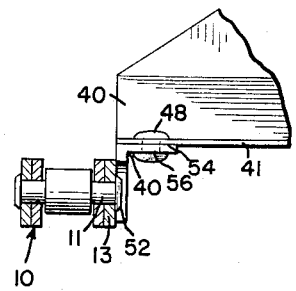
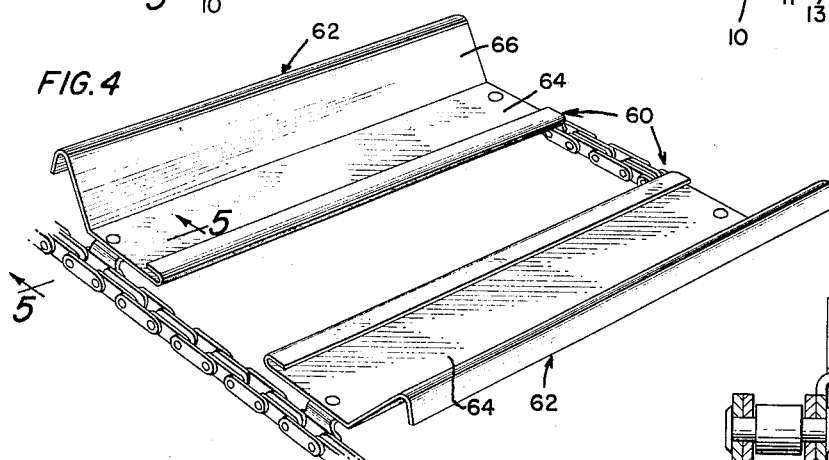
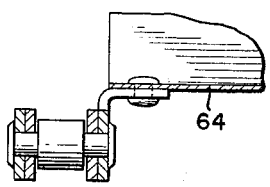
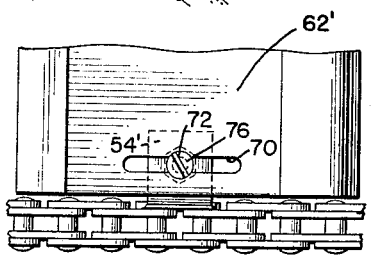
INVENTOR.
CHARLES E. BURFORD
BY
ATTORNEY

United States Patent Office 3,288,271
Patented Nov. 29, 1966

3,288,271
CONVEYER
Charles E. Burford, Maysville, Okla., assignor to The Burford Company, Maysville, Okla., a corporation of Oklahoma
Filed Oct. 8, 1964, Ser. No. 402,448
3 Claims. (Cl. 198—131)

This invention generally relates to conveyers and more particularly to an improved conveying mechanism suitable for transporting articles during a packaging operation of the type disclosed in U.S. Patent 3,138,904.

One of the objects of the present invention is to provide a conveyer wherein the articles to be conveyed may be loaded and unloaded with respect thereto in an improved manner characterized by speed, efficiency and simplicity.

A further object of the present invention is to provide a conveyer incorporating novel receptacles which effectively hold the articles as they are being conveyed and which are uniquely separable to receive and discharge the articles at the loading and unloading stations of the conveyer. Included herein is the provision of an endless chain conveyer which utilizes the movement of the chain about its associated sprockets for loading and unloading the article carrying receptacles.

A still further object of the present invention is to provide a conveyer which will achieve the above objects and yet may be economically manufactured and will successfully operate over long periods of repeated and rugged use.

Other objects as well as advantages of the present invention will become apparent from the following description taken in conjunction with the annexed drawings, in which:

FIG. 1 is a side elevational view of a conveyer embodying the present invention;

FIG. 2 is an enlarged perspective view of a receptacle assembly incorporated in the conveyer of FIG. 1;

FIG. 3 is an enlarged fragmental cross-sectional view taken generally along lines 3—3 of FIG. 2;

FIG. 4 is an enlarged perspective view of a segment of a conveyer illustrating another receptacle assembly embodying the present invention;

FIG. 5 is an enlarged fragmental cross-sectional view taken generally along lines 5—5 of FIG. 4; and FIG. 6 is a plan view of a segment of a conveyer illustrating a modification of the receptacle assembly of FIG. 4.

Referring to the drawings in detail, FIG. 1 shows a conveyer representing one embodiment of the invention which is operable to transport articles between a loading station designated A and unloading station designated B. One particularly useful application of the conveyer of FIG. 1 is in holding food articles, such as fowl which has been placed into a flexible wrapper or bag prior to reaching loading station A and are to be finally packaged at a point between stations A and B by tying the ends of the wrapper or bag. A mechanism for such wrapping and tying operation is disclosed in my U.S. Patent, identified above.

In the embodiment of FIG. 1, the conveyer comprises a pair of endless chains 10 and 12 of conventional construction positioned in side-by-side relationship and engaged about opposite end sprockets 14 and 16 (only one pair of sprockets being shown) to be driven thereby in unison in the usual manner. Sprockets 14 and 16 are mounted for rotation on shafts 18 and 20 respectively and a suitable motor (not shown) drives one of the sprockets while the other sprocket constitutes an idler sprocket. Preferably, a support rail 22 formed of a suitable self-lubricating, hard-wearing material is provided to support the upper run of the chains as shown in FIG. 1.

In accordance with the present invention, a plurality of receptacle assemblies generally designated 30 are provided on the chain at longitudinally spaced locations thereon so as to pick up an article at station A, and deliver and release it at station B. Each receptacle assembly 30 comprises a pair of support members 32 and 34 each of which is comprised of a plurality of planar, quadrilateral side portions 35a, 35b, 35c, 35d, and 35e and a depending leg portion 40 of right angular cross-section extending longitudinally between the ends thereof. Side portions 35a, 35b, 35c, 35d, and 35e of each support member extend at obtuse angles relative to each other and are formed so that one end 39 of the support member defines or encloses a greater area than the other end. In this manner, the articles are effectively held and at the same time sufficient space is provided at end 39 to permit the article wrappers to be tied.

As best shown in FIG. 2, receptacle members 32, 34 are fixed across the conveyer in opposed and longitudinally spaced relationship so as to form a substantially closed receptacle or cavity for receiving and supporting an article when the receptacle members are positioned along the upper run of the conveyer. In the specific embodiment, attachment of receptacle members 32, 34 to chains 10, 12 is accomplished by means of a pair of right angle brackets 50 associated with each support member. As shown in FIG. 3, each bracket 50 includes a first portion 52 suitably fixed such as by chain pin 11 to one of the links 13 of the associated chain and a second portion 54 extending inwardly in underlying relationship to the depending leg portion 41 of the support member where it is secured to the latter by means of a rivet 56.

From the foregoing, it will be seen that as each receptable assembly 30 passes about one of the sprockets 14, 16 the receptacle members will open or spread apart as shown in FIG. 1 because of the angular relationship between the chain links 13 (see FIG. 1) to which the receptacle members are fixed. In this open or spread apart position of receptacle members 30, the articles may be loaded such as at A or unloaded such as at B. As receptacle members 30 move from loading station A towards unloading station B, the chain links 13 will move into the same horizontal plane whereupon receptacle members 30 will move towards each other to a closed position to thereby effectively hold the article such as for the tying operation described above.

It will be appreciated that the amount of separation between receptacle members 32, 34 will depend upon the spacing between the receptacle members as well as the diameter of the end sprockets. Accordingly, these factors may be varied in order to provide a desired amount of separation between the receptacle members during loading or unloading.

Referring to FIGS. 4 and 5, another embodiment of the present invention is shown wherein a different receptacle assembly generally 60 is employed which includes identical tray members 62, each having a base portion 64 and an outer side portion 66 extending outwardly from the base at an obtuse angle. This embodiment of FIG. 4 is particularly useful in wrapping and tying articles such as bread loaves where different support members with a greater spacing therebetween may be employed. As in the above embodiment of FIG. 1, as tray members 62 pass about the chain sprockets, the trays 62 will be moved out of the same plane to facilitate unloading of the articles.

Referring to FIG. 6, there is illustrated a modification of the embodiment shown in FIG. 4 wherein the tray members 62' are fixed to the chains in a manner which permits the tray members 62' to be adjusted towards and away from each other so as to accommodate different size articles. In the specific modification of FIG. 6 this is accomplished by the provision of an elongated slot 70 formed on tray member 62' to extend in the direction of the chains; and a bolt 72 received through slot 70 and an aperture formed in the bracket portion 54'. Completing the mounting is a nut 76 placed on the lower end of bolt 72.

From the foregoing, it will therefore be seen the conveyer of the present invention will operate smoothly in loading and unloading the articles and will effectively hold the article during the packaging operation and without interfering with the latter.

As will be apparent to persons skilled in the art, various modifications and adaptations of the structure above described will become readily apparent without departure from the spirit and scope of the invention which is defined in the appended claims.

What is claimed is:

1. A conveyer comprising opposite end sprockets, a pair of endless chains engaged about said sprockets in side-by-side relationship to be driven by said sprockets, at least one receptacle assembly including a pair of receptacle members extending transversely with respect to said endless chains, said receptacle members including base portions and oppositely positioned side portions extending upwardly from the sides of the base portions, and means securing the opposite end portions of said receptacle members to said chain members, said means including an elongated slot in the opposite ends of each receptacle member and extending in the general longitudinal direction of said chains, brackets fixed with respect to the endless chains at the opposite ends of said receptacle members and having inwardly extending portions situated adjacent said slots, said inwardly extending bracket portions having apertures, and securing means received through said apertures and said slots at the opposite ends of said receptacle members to adjustably secure said receptacle members with respect to said endless chains.

2. A conveyer comprising an endless member and drive means for moving the endless member, a receptable assembly for supporting articles to be conveyed including a pair of associated members having generally planar base portions extending transversely of the endless member, said base portions having on their adjacent sides elongated inturned portions and on their opposite sides outwardly projecting portions extending at an obtuse angle relative to said base portions, said outwardly projecting portions terminating in portions extending outwardly and in reverse direction toward the planes of said base portions, and securing means for adjustably securing said receptable members with respect to said endless member for movement with said endless member, said securing means including elongated openings in said base portions of said receptable members oriented generally in the longitudinal direction of said endless member.

3. The structure defined in claim 2 wherein said securing means further includes a bracket fixed with respect to said endless member and having an apertured portion positioned adjacent said elongated opening, and a fastener received in said elongated opening and said aperture.

References Cited by the Examiner
UNITED STATES PATENTS

| | | | |
|---|---|---|---|
| 331,703 | 12/1885 | Grater-Seibel | 198—195 |
| 421,186 | 2/1890 | Munden | 198—195 X |
| 2,021,748 | 11/1935 | Schaefer | 198—189 |
| 2,086,070 | 7/1937 | Dunn. | |
| 2,358,292 | 9/1949 | Malhiot | 198—131 |
| 2,705,585 | 4/1955 | Wise | 198—179 X |
| 3,160,262 | 12/1964 | Nolte | 198—131 X |

EVON C. BLUNK, *Primary Examiner.*

EDWARD A. SROKA, *Examiner.*